United States Patent
Himmelmann et al.

(10) Patent No.: US 11,401,892 B2
(45) Date of Patent: Aug. 2, 2022

(54) TURBINE PUMP ASSEMBLY WITH TURBINE EXHAUST COOLED HEAT EXCHANGER FOR ACTIVE HYDRAULIC OIL

(71) Applicant: Hamilton Sundstrand Corporation, Charlotte, NC (US)

(72) Inventors: Richard A. Himmelmann, Beloit, WI (US); William T. Conroy, Winnebago, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 74 days.

(21) Appl. No.: 16/937,697

(22) Filed: Jul. 24, 2020

(65) Prior Publication Data
US 2022/0025903 A1    Jan. 27, 2022

(51) Int. Cl.
| F02K 9/60 | (2006.01) |
| F02K 9/80 | (2006.01) |
| F02K 9/84 | (2006.01) |
| F04D 1/00 | (2006.01) |
| F04D 13/12 | (2006.01) |
| F04D 15/00 | (2006.01) |
| F04D 29/58 | (2006.01) |

(52) U.S. Cl.
CPC ............... F02K 9/84 (2013.01); F04D 1/00 (2013.01); F04D 13/12 (2013.01); F04D 15/0005 (2013.01); F04D 29/5866 (2013.01); F02K 9/805 (2013.01)

(58) Field of Classification Search
CPC .. F01D 15/08; F04D 15/0005; F04D 29/5866; F04D 29/5873; F05D 2260/213; F02K 9/60; F02K 9/80; F02K 9/805; F02K 9/84; F02K 9/86; F02K 9/972
See application file for complete search history.

(56) References Cited

U.S. PATENT DOCUMENTS

| 2,752,858 | A | * | 7/1956 | Berges | ................ F04D 15/0066 |
| | | | | | 417/409 |
| 4,104,877 | A | * | 8/1978 | Bone | ........................ F02K 9/84 |
| | | | | | 60/230 |
| 4,599,044 | A | | 7/1986 | Jacobson | |
| 5,003,772 | A | | 4/1991 | Huber | |
| 10,233,931 | B2 | | 3/2019 | Himmelmann | |
| 10,590,959 | B2 | | 3/2020 | Oliphant et al. | |
| 2017/0175679 | A1 | * | 6/2017 | Himmelmann | ........... F04D 1/00 |

FOREIGN PATENT DOCUMENTS

EP    3085941 A1    10/2016

OTHER PUBLICATIONS

European Search Report for European Application No. 21187661.0, dated Dec. 14, 2021, 6 pages.

* cited by examiner

Primary Examiner — Richard A Edgar
Assistant Examiner — Jason G Davis
(74) Attorney, Agent, or Firm — Cantor Colburn LLP

(57) ABSTRACT

A turbine pump system includes a turbine pump assembly including a housing, a pump located in the housing, a turbine located in the housing and operably connected to the pump, and a heat exchanger located between the pump and a hydraulic fluid load. The heat exchanger is configured to reduce a temperature of a hydraulic fluid flow output by the pump and directed to the hydraulic fluid load. The heat exchanger is operably connected to a turbine gas flow and utilizes the turbine gas flow to cool the hydraulic fluid flow at the heat exchanger.

20 Claims, 8 Drawing Sheets

TURBINE PUMP ASSEMBLY WITH TURBINE EXHAUST COOLED HEAT EXCHANGER FOR ACTIVE HYDRAULIC OIL

BACKGROUND

Exemplary embodiments pertain to the art of turbine pump assemblies, and more particularly to cooling of hydraulic oil of turbine pump assemblies.

Turbine pump assemblies (TPAs) are utilized in high pressure fluid pumping applications, such as those in thrust vectoring control of rockets. The TPA includes a turbine which drives a hydraulic pump to generate the high hydraulic fluid pressure used to move hydraulic rams of the thrust vectoring systems. The TPA turbine is often powered by either hot combustion products or by high pressure cold gas provided to the TPAs.

A typical TPA turbine operates most efficiently at a very high RPM relative to the hydraulic pump. To accommodate the differences in operating speed between the turbine and the hydraulic pump, a gear reduction system is often incorporated between the hydraulic pump and the turbine.

Other TPAs utilize a high-speed centrifugal pump, directly coupled to the turbine shaft to generate the required hydraulic power. This TPA also utilizes a gear driven, mechanical speed control to keep the turbine operating near a pre-determined rotational speed. This TPA incorporates a turbine and a centrifugal pump on a single rotating shaft.

Still other TPAs are direct-drive centrifugal pump based TPAs and utilize a hydraulically controlled turbine speed control valve. Use of the centrifugal pump, however, causes heat to be transmitted to the hydraulic fluid. This heating forces the system to incorporate a large thermal mass. The art would appreciate solutions to cool the hydraulic fluid.

BRIEF DESCRIPTION

In one embodiment, a turbine pump system includes a turbine pump assembly including a housing, a pump located in the housing, a turbine located in the housing and operably connected to the pump, and a heat exchanger located between the pump and a hydraulic fluid load. The heat exchanger is configured to reduce a temperature of a hydraulic fluid flow output by the pump and directed to the hydraulic fluid load. The heat exchanger is operably connected to a turbine exhaust gas flow and utilizes the turbine gas flow to cool the hydraulic fluid flow at the heat exchanger.

Additionally or alternatively, in this or other embodiments a valve selectably directs one of the turbine gas flow or the hydraulic fluid flow through the heat exchanger.

Additionally or alternatively, in this or other embodiments a temperature sensor is located along a hydraulic fluid flow line between the heat exchanger and the hydraulic fluid load. The temperature sensor is operably connected to the valve.

Additionally or alternatively, in this or other embodiments a hydraulic outlet line extends from a pump outlet to the hydraulic fluid load.

Additionally or alternatively, in this or other embodiments the heat exchanger is located along the hydraulic outlet line.

Additionally or alternatively, in this or other embodiments a hydraulic bypass passage extends from the hydraulic outlet line. The heat exchanger is located along the hydraulic bypass passage.

Additionally or alternatively, in this or other embodiments the valve is located along the hydraulic outlet line, and is configured to selectable direct hydraulic fluid flow through the hydraulic bypass passage.

Additionally or alternatively, in this or other embodiments a turbine outlet line extends from a turbine outlet of the turbine.

Additionally or alternatively, in this or other embodiments the heat exchanger is located along the turbine exhaust line.

Additionally or alternatively, in this or other embodiments the turbine outlet passage directs turbine outlet gas through the heat exchanger.

Additionally or alternatively, in this or other embodiments the valve is configured and located to selectably direct the turbine outlet gas through the heat exchanger or through a turbine bypass passage extending from the turbine outlet line.

Additionally or alternatively, in this or other embodiments a flow of propellant drives the turbine. The flow of propellant is directed through the heat exchanger to cool the hydraulic fluid flow and pre-heat the flow of propellant, prior to the flow of propellant being introduced to the turbine.

Additionally or alternatively, in this or other embodiments the hydraulic load is a thrust vectoring actuator of a craft.

In another embodiment, a method of operating a turbine pump assembly includes directing a turbine fluid flow through a turbine to drive the rotation thereof, flowing a hydraulic fluid flow through a centrifugal pump via rotation of the turbine, thereby pressurizing a hydraulic fluid flow, directing the hydraulic fluid flow through a heat exchanger fluidly downstream of the centrifugal pump, reducing a temperature of the hydraulic fluid flow via thermal energy exchange with the turbine fluid flow at the heat exchanger, and directing the hydraulic fluid flow from the heat exchanger to a hydraulic fluid load.

Additionally or alternatively, in this or other embodiments one of the turbine gas flow or the hydraulic fluid flow is selectably discharged through the heat exchanger via a valve.

Additionally or alternatively, in this or other embodiments a temperature of the hydraulic fluid flow output from the centrifugal pump is sensed, and the valve is operated based on the sensed temperature.

Additionally or alternatively, in this or other embodiments operation of the valve controls the hydraulic fluid flow through the heat exchanger.

Additionally or alternatively, in this or other embodiments operation of the valve controls the turbine fluid flow through the heat exchanger.

Additionally or alternatively, in this or other embodiments the turbine fluid flow is passed through the heat exchanger before being inlet to the turbine.

Additionally or alternatively, in this or other embodiments the hydraulic load is a thrust vectoring actuator of a craft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
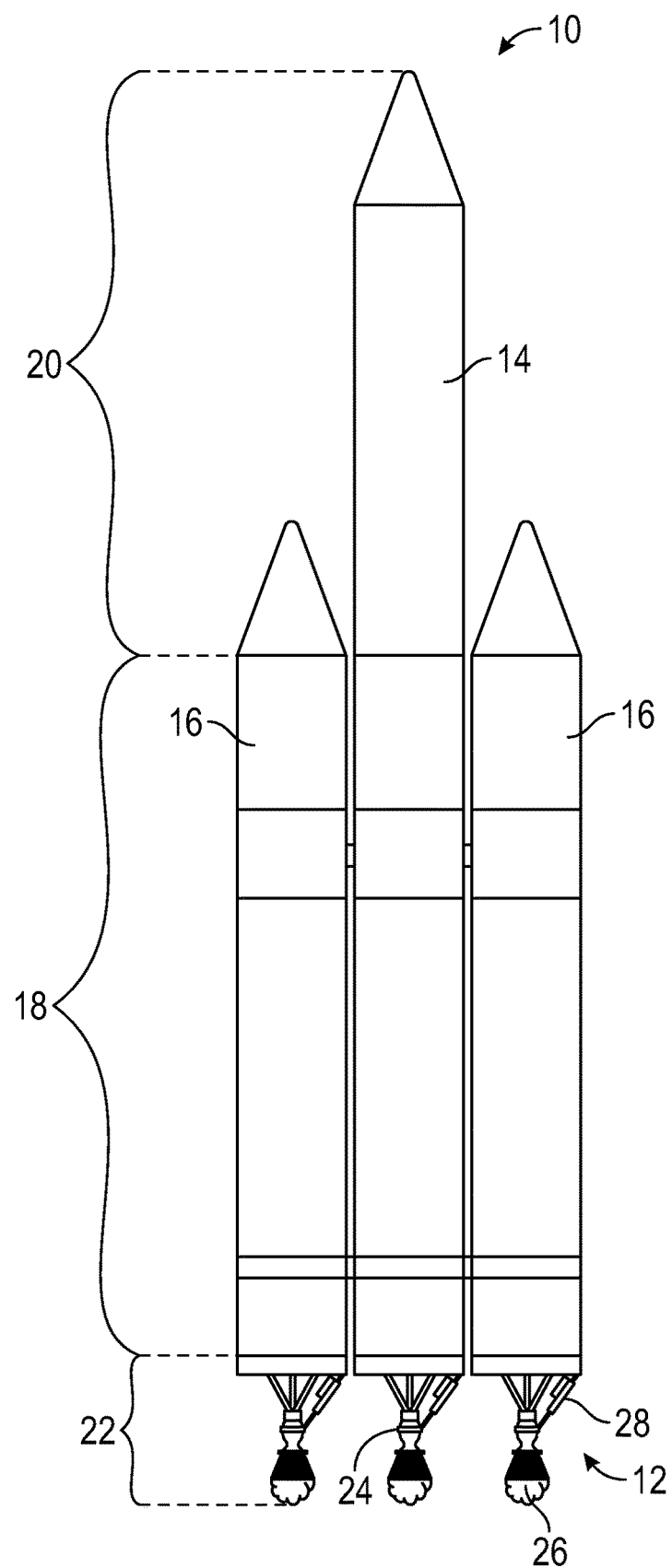
FIG. 1 is a schematic illustration of an embodiment of a craft.
Figure 2:
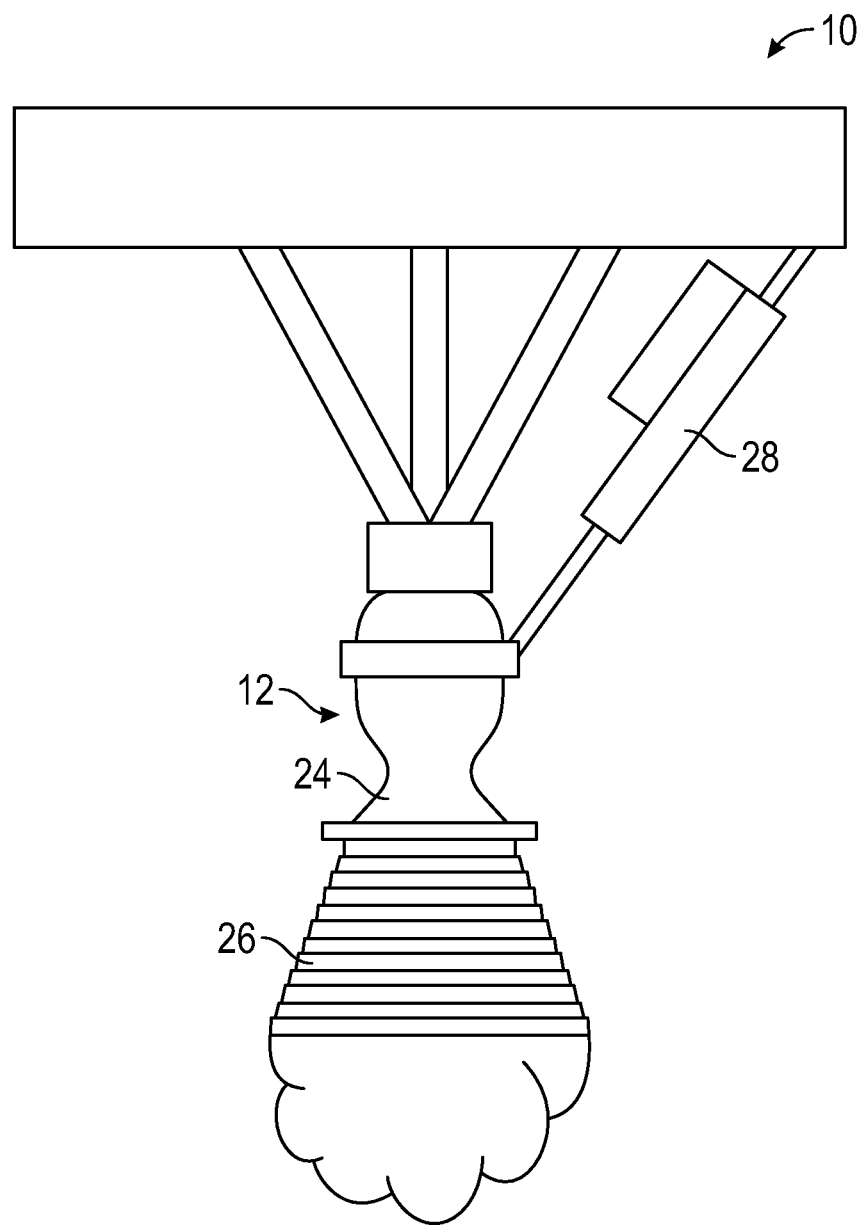
FIG. 2 is a schematic illustration of an embodiment of a propulsion system of a craft.

FIG. 1 shows a schematic illustration of the craft 10, which may be a rocket or other space craft. FIG. 2 shows an enlarged schematic illustration of the propulsion system 12 of the craft 10. The craft 10 may include a core booster 14 and may also have additional boosters 16. Each booster 14, 16 includes a body portion 18 extending from a nose portion 20 to a tail portion 22. The tail portion 22 includes the propulsion system 12. The propulsion system 12 includes an engine 24 of the booster. The body portions 18 may contain a liquid or solid propellant to fuel the engine 24 of the respective booster 14, 16. The body portion 18 may also be segmented into multiple booster stages, wherein each stage may contain its own engine. The nose portion 20 may contain, but is not limited to, avionics, payload, and crew compartment, etc. depending on the mission and/or configuration of the craft 10.

As shown, the craft 10 may have a propulsion system 12 that may be configured as one or more rocket engines 24. Each engine 24 may be configured with a nozzle 26 that is configured to direct an output of the respective engine 24. The nozzle 26 thus enables directional control of the thrust of the engine 24 and thus the craft 10. That is, depending on the angle of tilt of the nozzle 26, the craft 10 may be propelled in a specific direction. As such, control of the engine 24 and/or nozzle 26 may be paramount to directional control and safety.

Referring now to FIG. 2, an enlarged schematic illustration of the propulsion system 12 of the craft 10 according to an embodiment of the present disclosure. The engine 24 may include a combustion chamber and a throat with the nozzle 26 configured thereon to direct exhaust from the throat. Fuel from a respective booster (e.g., boosters 14, 16) is fed into the combustion chamber and ignited. The controlled explosion accelerates as it passes through the throat and out the nozzle 26. This controlled explosion creates the thrust required to propel the craft 10. In order to maneuver the craft 10, the thrust may be directed by a thrust vectoring actuator 28, which physically moves, tilts, translates, rotates, directs and/or adjusts the direction or angle of the engine 24 and/or the nozzle 26 to direct the thrust and thus the direction of movement of the craft 10. As will be appreciated by those of skill in the art, there may be two or more thrust vectoring actuators 28 included on the craft 10, with multiple thrust vectoring actuators 28 configured for each engine and/or nozzle. For example, in some embodiments, two thrust vectoring actuators may be positioned about ninety degrees apart to provide pitch and yaw capability to the craft 10. Accordingly, the thrust vectoring actuators 28 may be provided in operational connection with the engine 24 and/or the nozzle 26. In some configurations, the thrust vectoring actuators may incorporate hydraulic actuators and in other configurations the thrust vectoring actuators may incorporate electromechanical actuators.

Figure 3:
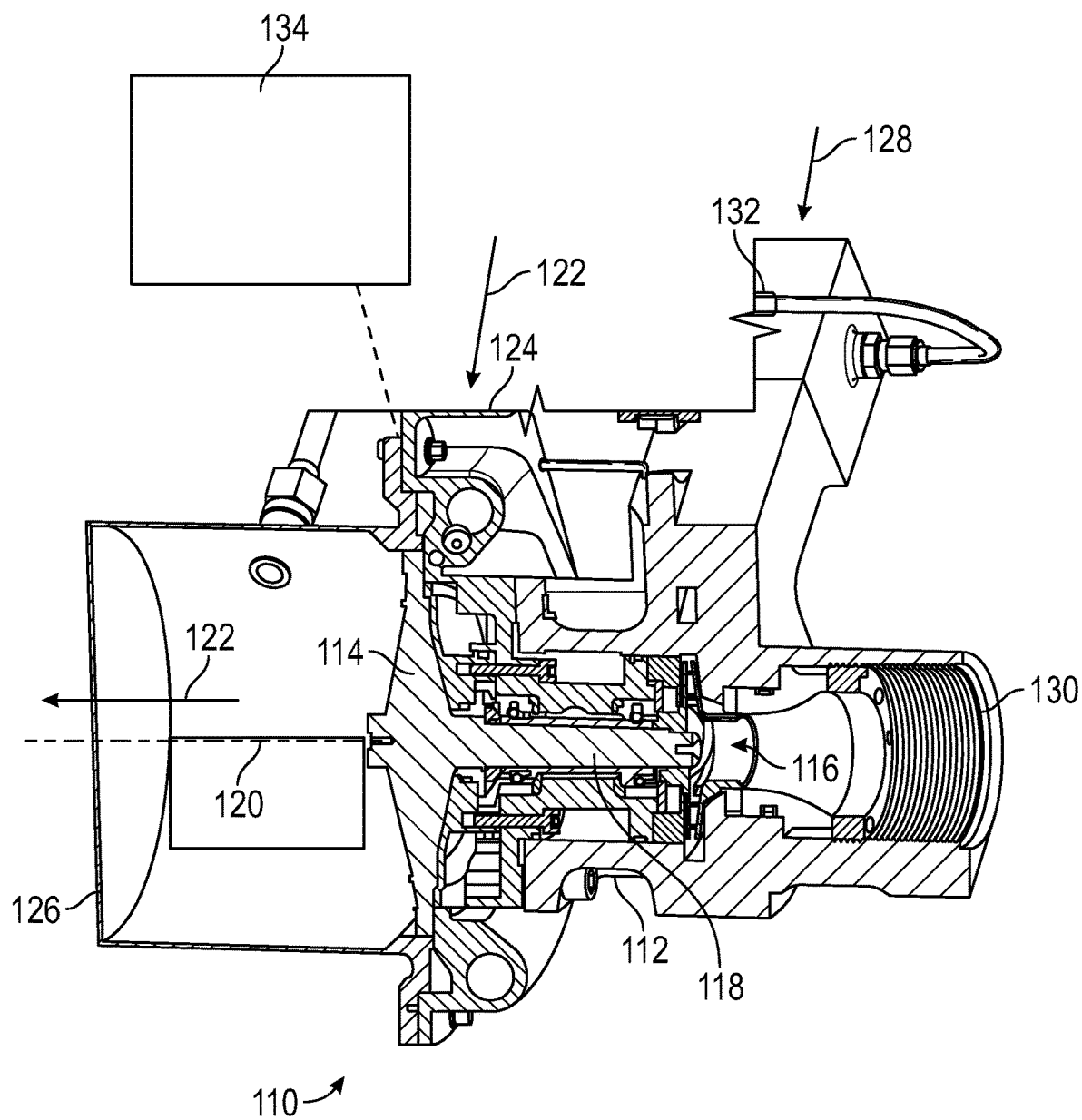
FIG. 3 is a schematic illustration of an embodiment of a turbine pump assembly.

Thrust vectoring actuators and related control systems may rely on hydraulic rams to displace the engine nozzle angle, relative to a rocket core axis. The hydraulic rams may require high pressure hydraulic fluid pumping systems capable of providing up to 4000 psia at flow rates of up to 40 gpm, and in other embodiments up to 200 gpm at up to 6000 psia. The hydraulic flow and pressure may be generated by a turbine pump assembly 110 (FIG. 3). The turbine pump assembly 110 can be powered by hot combustion products, or high pressure cold gas provided by, for example, the main engine turbo-pump assembly, or alternatively by a dedicated pneumatic cylinder on a smaller rocket.

For example, Referring to FIG. 3, illustrated is an embodiment of a turbine pump assembly 110. The turbine pump assembly 110 includes a housing 112, in which a turbine 114 and a centrifugal pump 116 are located. The centrifugal pump 116 and the turbine 114 are located along a common shaft 118. The turbine 114 is driven about a turbine axis 120 by a gas flow 122 input into the turbine 114 via a gas inlet port 124 and removed from the housing 112 via a turbine exhaust duct 126. Rotation of the turbine 114 drives rotation of the centrifugal pump 116, which pressurizes a hydraulic fluid flow 128 directed across the centrifugal pump 116. The hydraulic fluid flow 128 is introduced to the centrifugal pump 116 via a hydraulic pump inlet 130 and removed from the centrifugal pump 116 via a hydraulic pump outlet 132. A speed control valve 134 operably connected to the hydraulic pump outlet 132 and to the turbine 114 utilizes hydraulic fluid pressure to maintain the rotational speed of the turbine 114 within a selected range.

Figure 4:
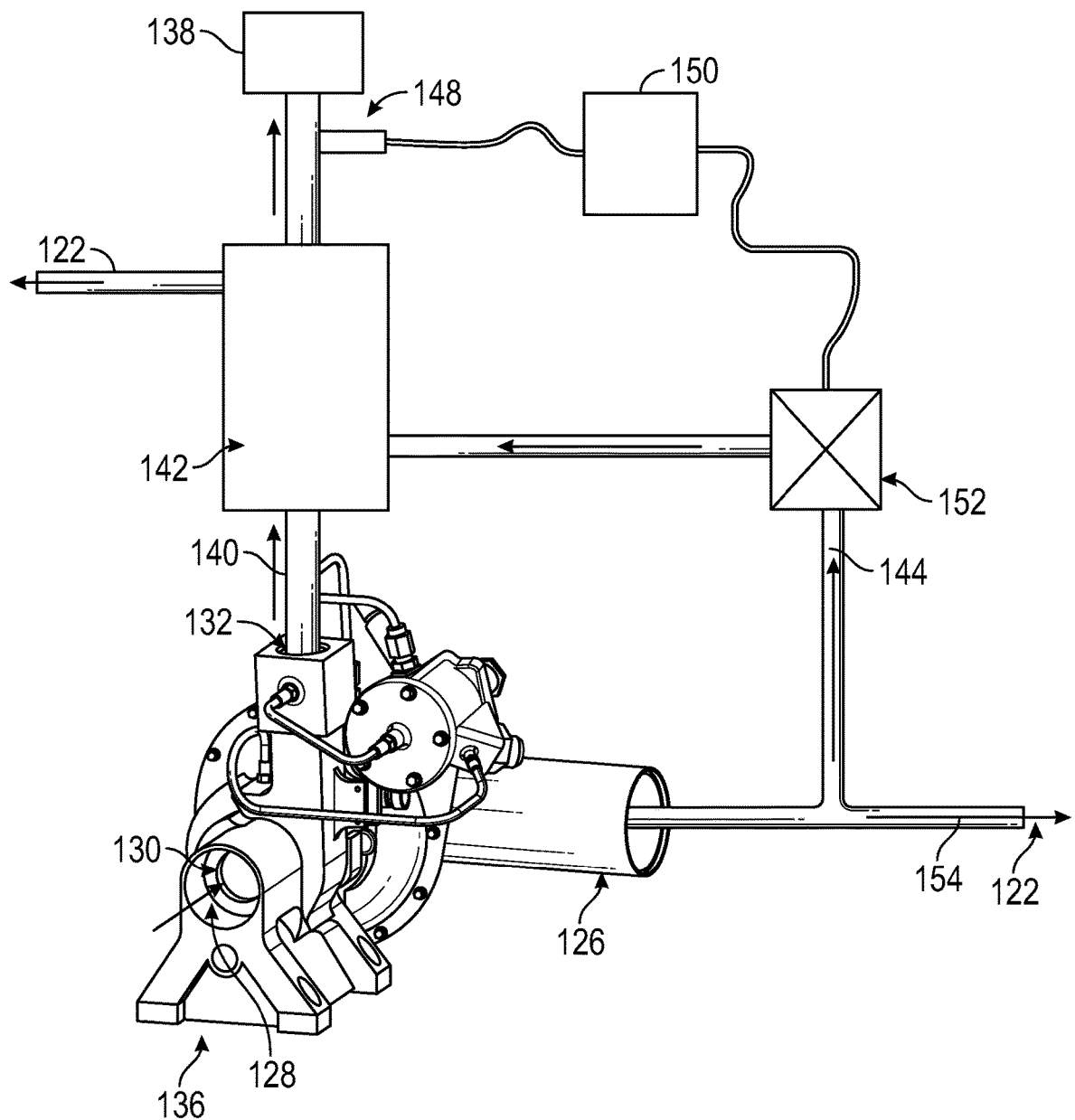
FIG. 4 is a schematic illustration of an embodiment of a hydraulic fluid cooling system for a turbine pump assembly.

Referring now to FIG. 4, illustrated is an embodiment of a turbine pump system 136. The turbine pump system 136 circulates the hydraulic fluid flow 128 between the turbine pump assembly 110 and a hydraulic fluid load 138, such as a thrust vectoring actuator 28. The hydraulic fluid flow 128 flows from the turbine pump assembly 110 via the hydraulic pump outlet 132 along a hydraulic outlet line 140 and through a hydraulic fluid heat exchanger 142. Further, the gas flow 122 from the turbine 114 is flowed from the turbine exhaust duct 126 along a turbine outlet line 144 and through the hydraulic fluid heat exchanger 142. At the hydraulic fluid heat exchanger 142, thermal energy is exchanged between the relatively high temperature hydraulic fluid flow 128 and the relatively low temperature gas flow 122, thereby cooling the hydraulic fluid flow 128. From the hydraulic fluid heat exchanger 142, the hydraulic fluid flow 128 proceeds to the hydraulic fluid load 138. Once utilized at the hydraulic fluid load 138, the hydraulic fluid flow 128 is circulated back to the hydraulic pump inlet 130 via a hydraulic inlet line (not shown). The gas flow 122 is flowed from the hydraulic fluid heat exchanger 142 to, for example, ambient.

The turbine pump system 136 further includes a hydraulic fluid temperature sensor 148 disposed along the hydraulic outlet line 140 between the hydraulic fluid heat exchanger 142 and the hydraulic fluid load 138. The hydraulic fluid temperature sensor 148 senses a temperature of the hydraulic fluid flow 128 leaving the hydraulic fluid heat exchanger 142. Based on the sensed temperature, a temperature controller 150 operably connected to the hydraulic fluid temperature sensor 148 commands a turbine exhaust gas flow valve 152 located along the turbine outlet line 144 to open or close, thus directing more or less of the gas flow 122 through the hydraulic fluid heat exchanger 142. Increasing or decreasing the gas flow 122 into the hydraulic fluid heat exchanger 142 thus increases or decreases the cooling of the hydraulic fluid flow 128 thereat. Thus, the operation of the turbine exhaust gas flow valve 152 via the hydraulic fluid temperature sensor 148 and the temperature controller 150 allows a selected temperature of the hydraulic fluid flow 128 to be achieved at the hydraulic fluid heat exchanger 142. Excess gas flow 122 not passed through the turbine exhaust gas flow valve 152 is flowed along a bypass passage 154 to ambient.

Figure 5:
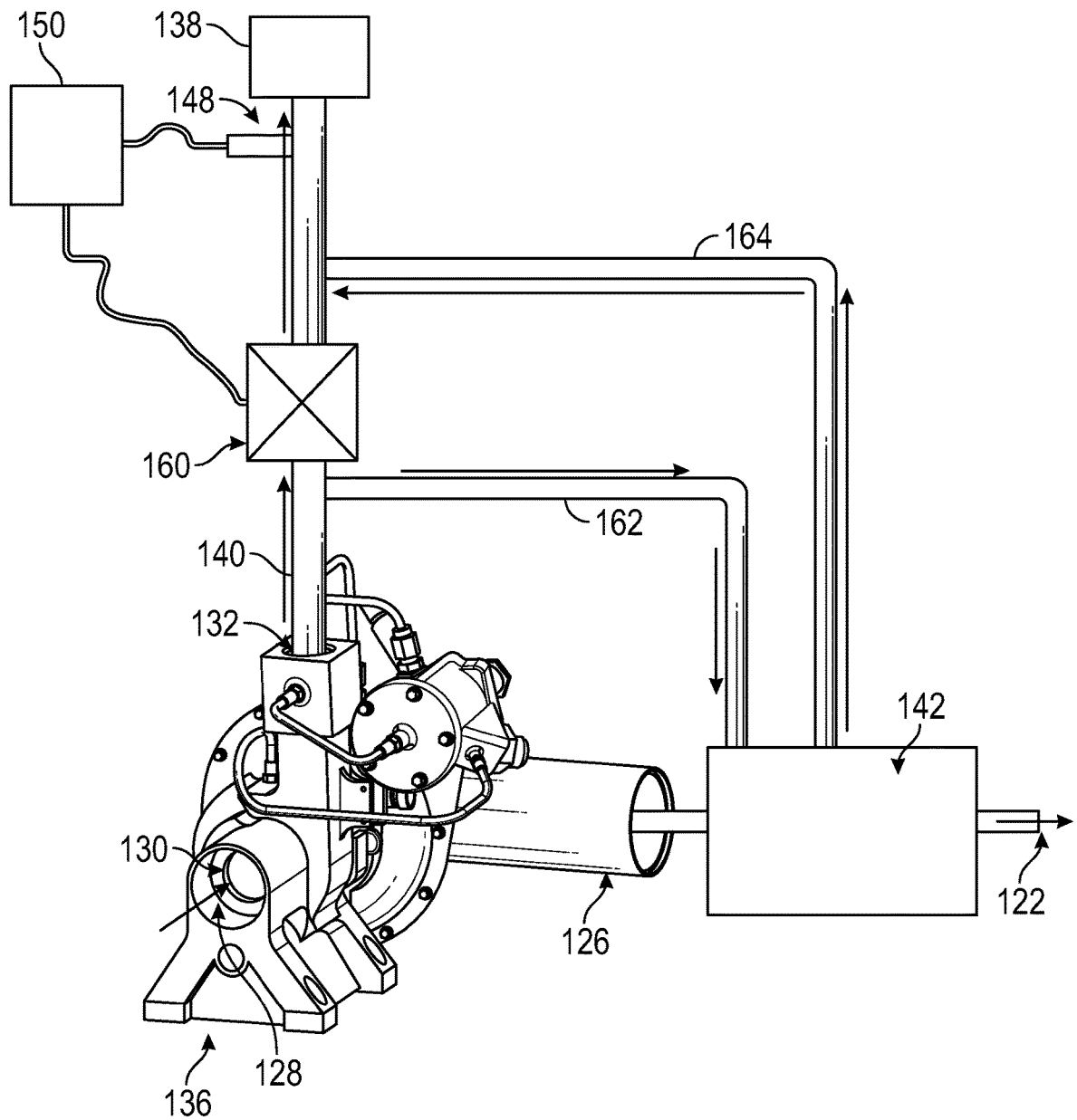
FIG. 5 is a schematic illustration of another embodiment of a hydraulic fluid cooling system for a turbine pump assembly.

Referring now to FIG. 5, in another embodiment the system utilizes an active hydraulic fluid control valve 160 positioned along the hydraulic outlet line 140. A heat exchanger input line 162 branches from the hydraulic outlet line 140 upstream of the active hydraulic fluid control valve 160 and extends to the hydraulic fluid heat exchanger 142. A heat exchanger output line 164 extends from the hydraulic fluid heat exchanger 142 and connects to the hydraulic outlet line 140 downstream of the active hydraulic fluid control valve 160. The hydraulic fluid temperature sensor 148 senses the temperature of the hydraulic fluid flow 128 leaving in the hydraulic outlet line 140 downstream of the heat exchanger output line 164. Based on the sensed temperature, the temperature controller 150 operably connected to the hydraulic fluid temperature sensor 148 commands operation of the active hydraulic fluid control valve 160. When the active hydraulic fluid control valve 160 is commanded toward a closed position, flow of hydraulic fluid through the hydraulic fluid control valve is restricted, increasing the flow of hydraulic fluid through the hydraulic fluid heat exchanger 142 via the heat exchanger input line 162 and the heat exchanger output line 164. Thus, the temperature of the hydraulic fluid flow 128 directed to the hydraulic fluid load 138 is reduced. Alternatively, when the active hydraulic fluid control valve 160 is moved toward an open position, the flow of hydraulic fluid through the hydraulic fluid heat exchanger 142 is decreased, thus increasing the temperature of the hydraulic fluid flow 128 directed to the hydraulic fluid load 138.

Figure 6:
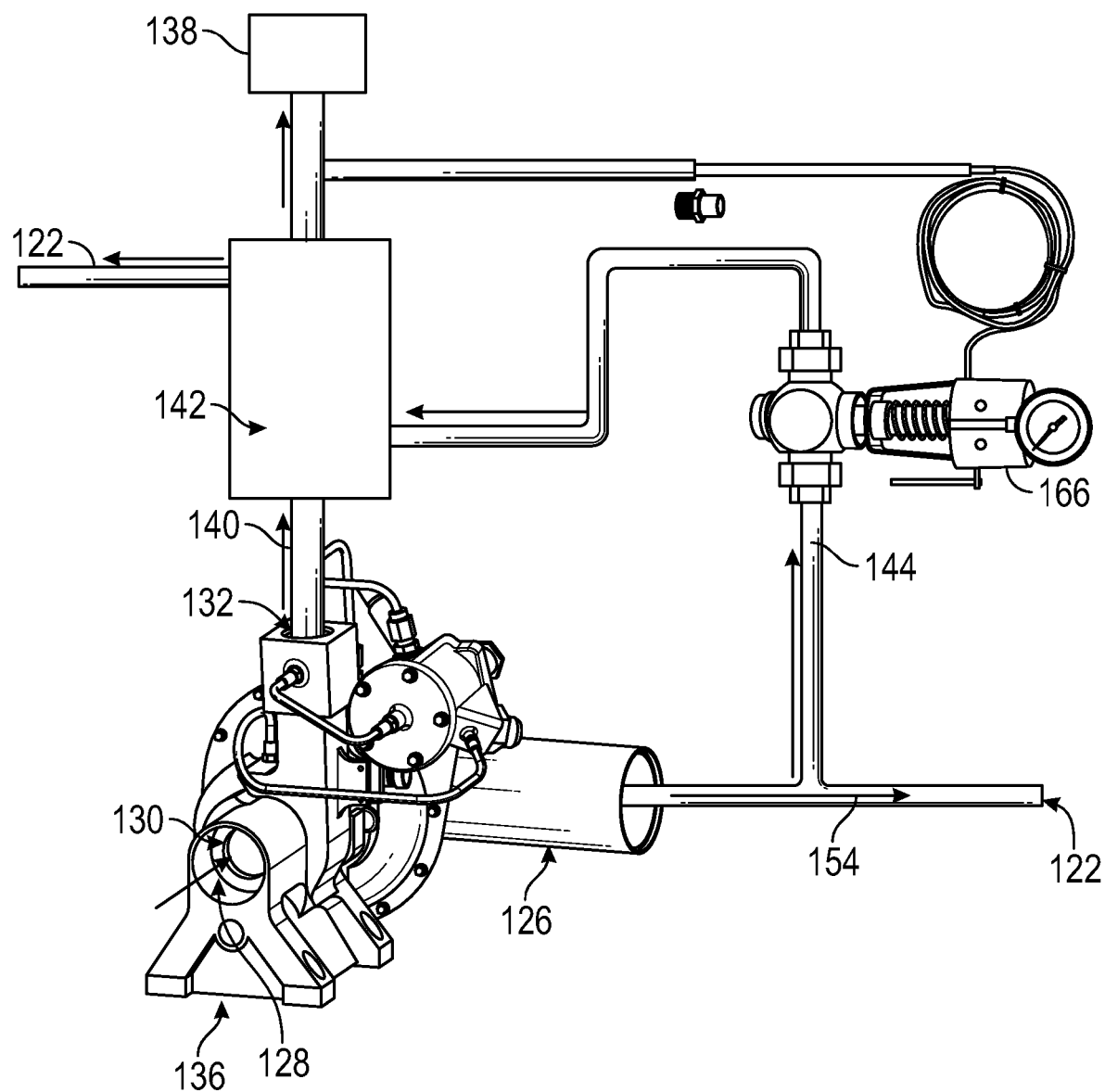
FIG. 6 is a schematic illustration of yet another embodiment of a hydraulic fluid cooling system for a turbine pump assembly.

Referring now to FIG. 6, is some embodiments a passive turbine exhaust gas flow valve 166 is located along the turbine outlet line 144. The passive turbine exhaust gas flow valve 166 is operably connected to the hydraulic outlet line 140 between the hydraulic fluid heat exchanger 142 and the hydraulic fluid load 138 to detect a temperature of the hydraulic fluid flow 128 thereat. As the temperature of the hydraulic fluid flow 128 leaving the hydraulic fluid heat exchanger 142 increases, the passive turbine exhaust gas flow valve 166 is forced toward an open position, thus allowing more relatively low temperature gas flow 122 therethrough and into the hydraulic fluid heat exchanger 142. This, in turn, reduces the temperature of the hydraulic fluid flow 128 leaving the hydraulic fluid heat exchanger 142. Excess gas flow 122 not passed through the passive turbine exhaust gas flow valve 166 is flowed along the bypass passage 154 to ambient.

Figure 7:
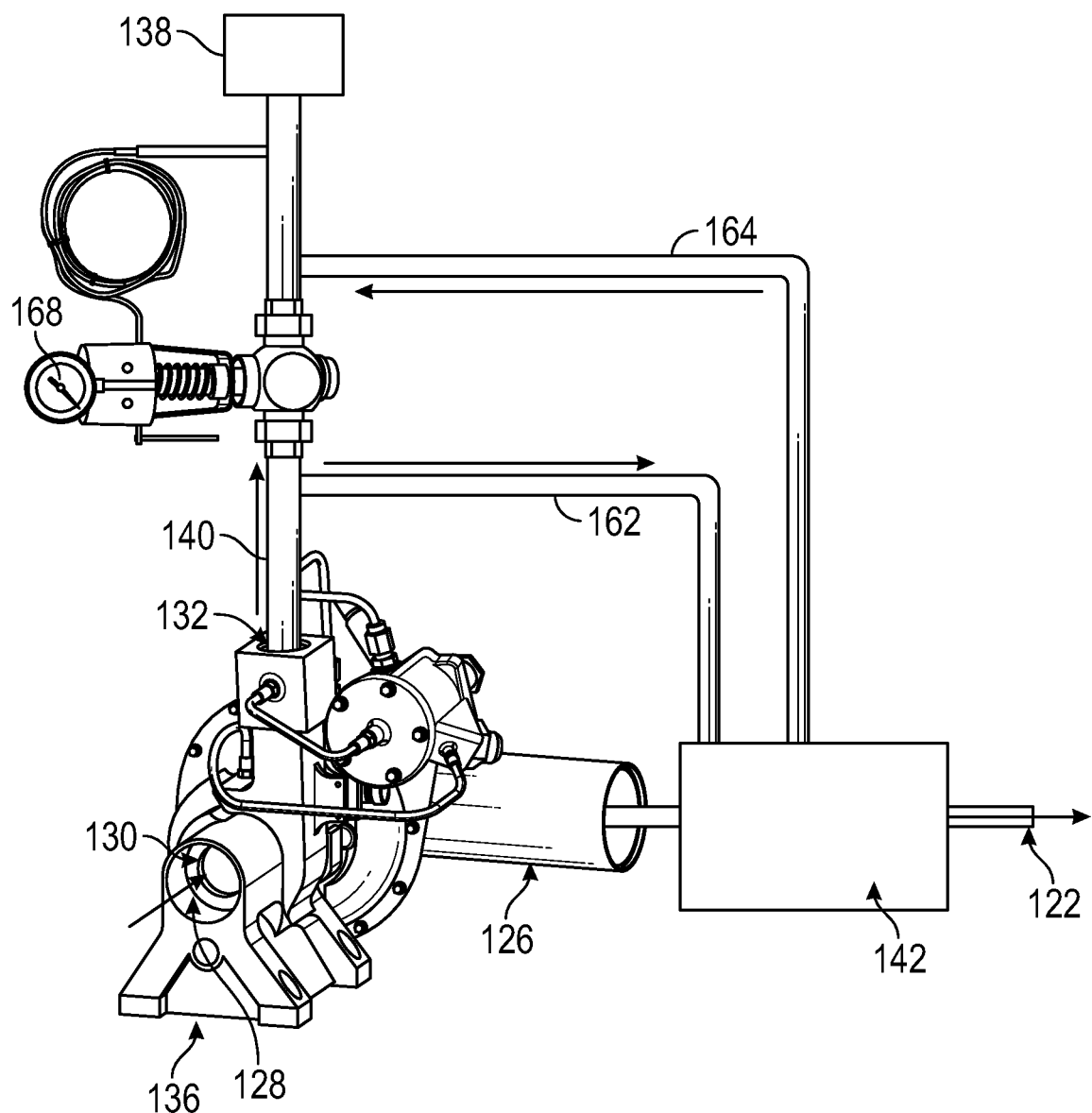
FIG. 7 is a schematic illustration of still another embodiment of a hydraulic fluid cooling system for a turbine pump assembly.

Referring now to FIG. 7, in another embodiment the system utilizes a passive hydraulic fluid control valve 168 positioned along the hydraulic outlet line 140. The passive hydraulic fluid control valve 168 is located along the hydraulic outlet line 140 between the heat exchanger input line 162 and the heat exchanger output line 164. The passive hydraulic fluid control valve 168 further detects the temperature of the hydraulic fluid flow 128 leaving in the hydraulic outlet line 140 downstream of the heat exchanger output line 164. As the temperature of the hydraulic fluid flow 128 flowing along the hydraulic outlet line 140 increases, the passive hydraulic fluid control valve 168 is forced toward a closed position. Thus, flow of hydraulic fluid through the passive hydraulic fluid control valve 168 is restricted, increasing the flow of hydraulic fluid through the hydraulic fluid heat exchanger 142 via the heat exchanger input line 162 and the heat exchanger output line 164. Thus, the temperature of the hydraulic fluid flow 128 directed to the hydraulic fluid load 138 is reduced.

Figure 8:
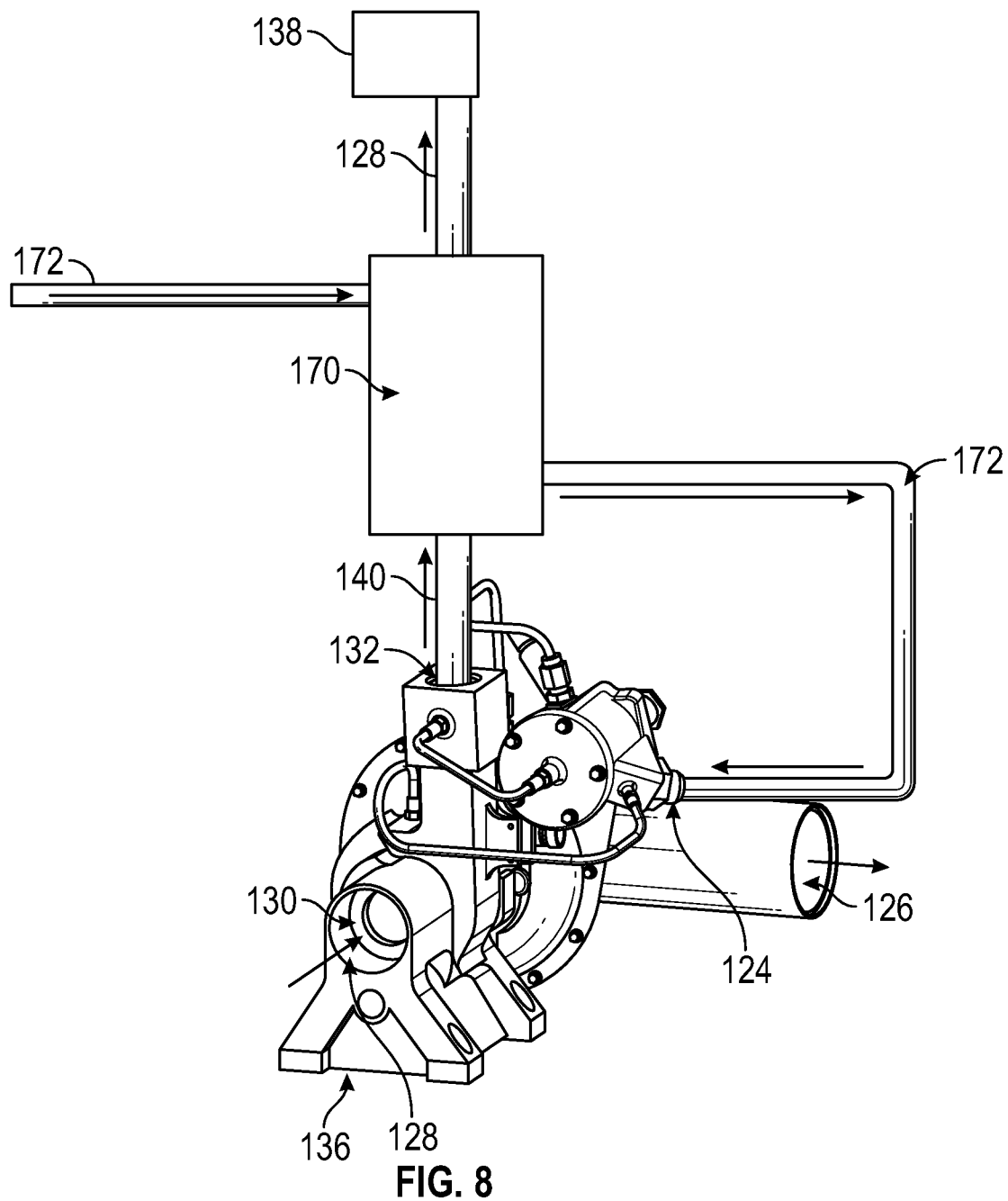
FIG. 8 a schematic illustration of another embodiment of a hydraulic fluid cooling system for a turbine pump assembly.

Referring now to FIG. 8, in some embodiments a recuperator 170 is utilized to reduce the temperature of the hydraulic fluid flow 128 directed to the hydraulic fluid load 138. The recuperator 170 is located along the hydraulic outlet line 140 and low temperature propellant flow 172 is passed through the recuperator 170, where thermal energy is exchanged with the relatively high temperature hydraulic fluid flow 128 to cool the hydraulic fluid flow 128. The propellant flow 172 is then directed to the gas inlet port 124 to drive the turbine 114. In some embodiments, the propellant flow 172 is provided to the recuperator 170 from, for example, a propellant supply of a rocket controlled by the thrust vectoring actuator 28.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turbine pump system, comprising:
    a turbine pump assembly including:
        a housing;
        a pump disposed in the housing;
        a turbine disposed in the housing and operably connected to the pump; and
        a heat exchanger disposed between the pump and a hydraulic fluid load, the heat exchanger configured to reduce a temperature of a hydraulic fluid flow output by the pump and directed to the hydraulic fluid load;
        wherein the heat exchanger is operably connected to a turbine gas flow and utilizes the turbine gas flow to cool the hydraulic fluid flow at the heat exchanger.

2. The turbine pump system of claim 1, further comprising a valve to selectably direct one of the turbine gas flow or the hydraulic fluid flow through the heat exchanger.

3. The turbine pump system of claim 2, further comprising a temperature sensor disposed along a hydraulic fluid flow line between the heat exchanger and the hydraulic fluid load, the temperature sensor operably connected to the valve.

4. The turbine pump system of claim 2, further comprising a hydraulic outlet line extending from a pump outlet to the hydraulic fluid load.

5. The turbine pump system of claim 4, wherein the heat exchanger is disposed along the hydraulic outlet line.

6. The turbine pump system of claim 4, further comprising a hydraulic bypass passage extending from the hydraulic outlet line, the heat exchanger disposed along the hydraulic bypass passage.

7. The turbine pump system of claim 6, wherein the valve is disposed along the hydraulic outlet line, and is configured to selectable direct hydraulic fluid flow through the hydraulic bypass passage.

8. The turbine pump system of claim 2, further comprising a turbine outlet line extending from a turbine outlet of the turbine.

9. The turbine pump system of claim 8, wherein the heat exchanger is disposed along the turbine exhaust line.

10. The turbine pump system of claim 8, wherein the turbine outlet passage directs turbine outlet gas through the heat exchanger.

11. The turbine pump system of claim 10, wherein the valve is configured and disposed to selectably direct the turbine outlet gas through the heat exchanger or through a turbine bypass passage extending from the turbine outlet line.

12. The turbine pump system of claim 2, further comprising a flow of propellant to drive the turbine, the flow of propellant directed through the heat exchanger to cool the hydraulic fluid flow, prior to the flow of propellant being introduced to the turbine.

13. The turbine pump system of claim 1, wherein the hydraulic load is a thrust vectoring actuator of a craft.

14. A method of operating a turbine pump assembly, comprising:
   directing a turbine fluid flow through a turbine to drive the rotation thereof;
   flowing a hydraulic fluid flow through a centrifugal pump via rotation of the turbine, thereby pressurizing a hydraulic fluid flow;
   directing the hydraulic fluid flow through a heat exchanger fluidly downstream of the centrifugal pump;
   reducing a temperature of the hydraulic fluid flow via thermal energy exchange with the turbine fluid flow at the heat exchanger; and
   directing the hydraulic fluid flow from the heat exchanger to a hydraulic fluid load.

15. The method of claim 14, further comprising selectably directing one of the turbine gas flow or the hydraulic fluid flow through the heat exchanger via a valve.

16. The method of claim 15, further comprising:
   sensing a temperature of the hydraulic fluid flow output from the centrifugal pump; and
   operating the valve based on the sensed temperature.

17. The method of claim 15, wherein operation of the valve controls the hydraulic fluid flow through the heat exchanger.

18. The method of claim 15, wherein operation of the valve controls the turbine fluid flow through the heat exchanger.

19. The method of claim 15, wherein the turbine fluid flow is passed through the heat exchanger before being inlet to the turbine.

20. The method of claim 14, wherein the hydraulic load is a thrust vectoring actuator of a craft.

* * * * *